(12) United States Patent
Sombrutzki et al.

(10) Patent No.: US 8,780,743 B2
(45) Date of Patent: Jul. 15, 2014

(54) METHOD AND SYSTEM FOR IMPROVING QUALITY OF SERVICE IN DISTRIBUTED WIRELESS NETWORKS

(75) Inventors: Robert Sombrutzki, Berlin (DE); Pablo Vidales, Las Americas Naucalpan Edo (MX); Anatolij Zubow, Berlin (DE)

(73) Assignee: Deutsche Telekom AG, Bonn (DE)

( * ) Notice: Subject to any disclaimer, the term of this patent is extended or adjusted under 35 U.S.C. 154(b) by 537 days.

(21) Appl. No.: 12/948,844

(22) Filed: Nov. 18, 2010

(65) Prior Publication Data

US 2011/0122788 A1 May 26, 2011

(30) Foreign Application Priority Data

Nov. 20, 2009 (EP) .................................... 09176572

(51) Int. Cl.
*H04L 12/801* (2013.01)
*H04L 12/54* (2013.01)
*H04L 12/56* (2006.01)

(52) U.S. Cl.
CPC ............... *H04L 47/10* (2013.01); *H04L 12/54* (2013.01)
USPC ......................................................... 370/252

(58) Field of Classification Search
CPC ..... H04L 47/10; H04L 43/50; H04L 12/2697; H04L 43/0852; H04L 43/00
See application file for complete search history.

(56) References Cited

U.S. PATENT DOCUMENTS

| 4,370,743 | A | * | 1/1983 | Moran | 370/364 |
|---|---|---|---|---|---|
| 5,293,640 | A | * | 3/1994 | Gunmar et al. | 455/446 |
| 5,297,142 | A | * | 3/1994 | Paggeot et al. | 370/461 |
| 5,343,461 | A | * | 8/1994 | Barton et al. | 370/249 |
| 5,444,851 | A | * | 8/1995 | Woest | 709/222 |
| 5,479,120 | A | * | 12/1995 | McEwan | 327/91 |
| 6,308,085 | B1 | * | 10/2001 | Shoki | 455/562.1 |
| 6,459,901 | B1 | | 10/2002 | Chawla | |
| 7,574,179 | B2 | * | 8/2009 | Barak et al. | 455/101 |
| 7,620,370 | B2 | * | 11/2009 | Barak et al. | 455/67.13 |
| 2001/0001268 | A1 | * | 5/2001 | Menon et al. | 370/329 |
| 2002/0181395 | A1 | * | 12/2002 | Foster et al. | 370/229 |
| 2003/0179712 | A1 | * | 9/2003 | Kobayashi et al. | 370/249 |
| 2004/0136344 | A1 | * | 7/2004 | Kim et al. | 370/335 |
| 2006/0013179 | A1 | * | 1/2006 | Yamane | 370/338 |

(Continued)

OTHER PUBLICATIONS

Abusubaih, M., Rathke, B., Wolisz, A., (Abusubaih et al.);"A framework for interference mitigation in multi-BSS 802.11 wireless LANs," World of Wireless, Mobile and Multimedia Networks & Workshops, 2009, WoWMoM, 2009. IEEE International Symposium on a, vol., no., pp. 1,11, Jun. 15-19, 2009, doi: 10.1109/WOWMOM. 2009.5282490.*

(Continued)

*Primary Examiner* — Andrew Lai
*Assistant Examiner* — Hoyet H Andrews
(74) *Attorney, Agent, or Firm* — Leydig, Voit & Mayer, Ltd.

(57) ABSTRACT

A method for organizing an architecture of access points in a distributed wireless network includes measuring interference between the access points, assigning radiofrequency channels to the access points based on the measured interference and creating distributed antenna groups of multiple access points operating on a same radio frequency channel. A distributed wireless network includes a plurality of access points and a central controller connected to the access points via a common backbone, the central controller being configured to assign radio frequency channels to the access points according to the method.

13 Claims, 7 Drawing Sheets

(56) References Cited

U.S. PATENT DOCUMENTS

| | | | |
|---|---|---|---|
| 2006/0251038 A1* | 11/2006 | Tamura et al. | 370/342 |
| 2007/0297423 A1* | 12/2007 | Furukawa et al. | 370/400 |
| 2008/0070510 A1* | 3/2008 | Doppler et al. | 455/69 |
| 2008/0090575 A1* | 4/2008 | Barak et al. | 455/444 |
| 2008/0298486 A1* | 12/2008 | Venturino et al. | 375/260 |
| 2010/0128630 A1* | 5/2010 | Barak et al. | 370/254 |
| 2010/0142448 A1* | 6/2010 | Schlicht et al. | 370/328 |
| 2011/0026424 A1* | 2/2011 | Feder et al. | 370/252 |
| 2011/0164527 A1* | 7/2011 | Mishra et al. | 370/252 |
| 2012/0257585 A1* | 10/2012 | Sydor et al. | 370/329 |
| 2013/0094366 A1* | 4/2013 | Lee et al. | 370/241 |
| 2013/0156001 A1* | 6/2013 | Gomadam | 370/330 |
| 2013/0170387 A1* | 7/2013 | Wang et al. | 370/252 |
| 2013/0195100 A1* | 8/2013 | Baker et al. | 370/350 |
| 2013/0208604 A1* | 8/2013 | Lee et al. | 370/252 |

OTHER PUBLICATIONS

Bejerano, Yigal; Bhatia, Randeep S.; (Bejerano et al.);"MiFi: a framework for fairness and QoS assurance for current IEEE 802.11 networks with multiple access points", IEEE/ACM Transactions on Networking (TON) , vol. 14 Issue 4; Aug. 2006; Publisher: IEEE Press.*

Al Mamun, K.M.A.; Joshi, G.P.; Jonayed, M.R.; Sung Won Kim, "An Efficient Variable Channel Allocation Technique for Wireless Local Area Network (WLAN) IEEE802.11 Standard," Circuits, Communications and Systems, 2009. PACCS '09. Pacific-Asia Conference on, vol., no., pp. 92,95, May 16-17, 2009, doi: 10.1109/PACCS.2009.174.*

Lichun Bao and J.J. Garcia-Luna-Aceves., titled "Distributed dynamic channel access scheduling for ad hoc networks," (Bao hereinafter) was presented Journal of Parallel and Distributed Computing, vol. 63, Issue 1, Jan. 2003, pp. 3-14, ISSN 0743-7315, dx.doi.org/10.1016/S0743-7315(02)00039-4.*

Weiyan Ge; Junshan Zhang; Wieselthier, J.E.; Xuemin Shen, et al., titled "PHY-aware distributed scheduling for ad hoc communications with physical interference model," (Ge hereinafter) was presented Wireless Communications, IEEE Transactions on , vol. 8, no. 5, pp. 2682,2693, May 2009, doi: 10.1109/TWC.2008.080798.*

PHY-aware distributed scheduling for ad hoc communications with physical interference model, (Ge hereinafter) was presented Wireless Communications, IEEE Transactions on , vol. 8, No. 5, pp. 2682,2693, May 2009, doi: 10.1109/TWC.2008.080798.*

Distributed dynamic channel access scheduling for ad hoc networks, (Bao hereinafter) was presented Journal of Parallel and Distributed Computing, vol. 63, Issue 1, Jan. 2003, pp. 3-14, ISSN 0743-7315, dx.doi.org/10.1016/S0743-7315(02)00039-4.*

Sengupta et al., titled "Dynamic Spectrum Access in Cognitive Radio based Tactical Networks," (Sengupta hereinafter) was presented as Wireless Communications and Networking Conference, 2009. WCNC 2009, IEEE, vol., no., pp. 1,6, Apr. 5-8, 2009, doi: 10.1109/WCNC.2009.4917688.*

Sombrutzki, R.; Zubow, A.; Kurth, M.; Redlich, J.-P., et al., titled "Self-Organization in Community Mesh Networks the Berlin Roof Net," (Sombrutzki hereinafter) was presented as Operator-Assisted (Wireless Mesh) Community Networks, 2006 1st Workshop on, vol., no., pp. 1, 11, Sep. 2006, doi: 10.1109/WOACN.2006.337188.*

IEEE P802.11-REVma™/D8.09.0 (Revision of IEEE Std 802.11-1999) Draft Standard for Information Technology—Telecommunications and information exchange between systems—Local and metropolitan area networks—Specific requirements Part 11: Wireless LAN Medium Access Control (MAC) and Physical Layer (PHY) specifications.*

Baldo, O., "A Cross-Layer Distributed Call Admission Control," Wireless and Mobile Computing, Networking and Communications, 2009. WIMOB 2009. IEEE International Conference on, vol., no., pp. 441,446, Oct. 12-14, 2009, doi: 10.1109/WiMob.2009.81.*

IEEE P802.11-REVma™/D8.09.0 (Revision of IEEE Std 802.11-1999) Draft Standard for Information Technology—Telecommunications and information exchange between systems—Local and metropolitan area networks—Specific requirements Part 11: Wireless LAN Medium Access Control (MAC) and Physical Layer (PHY) specifications, pp. 1-1230.*

* cited by examiner

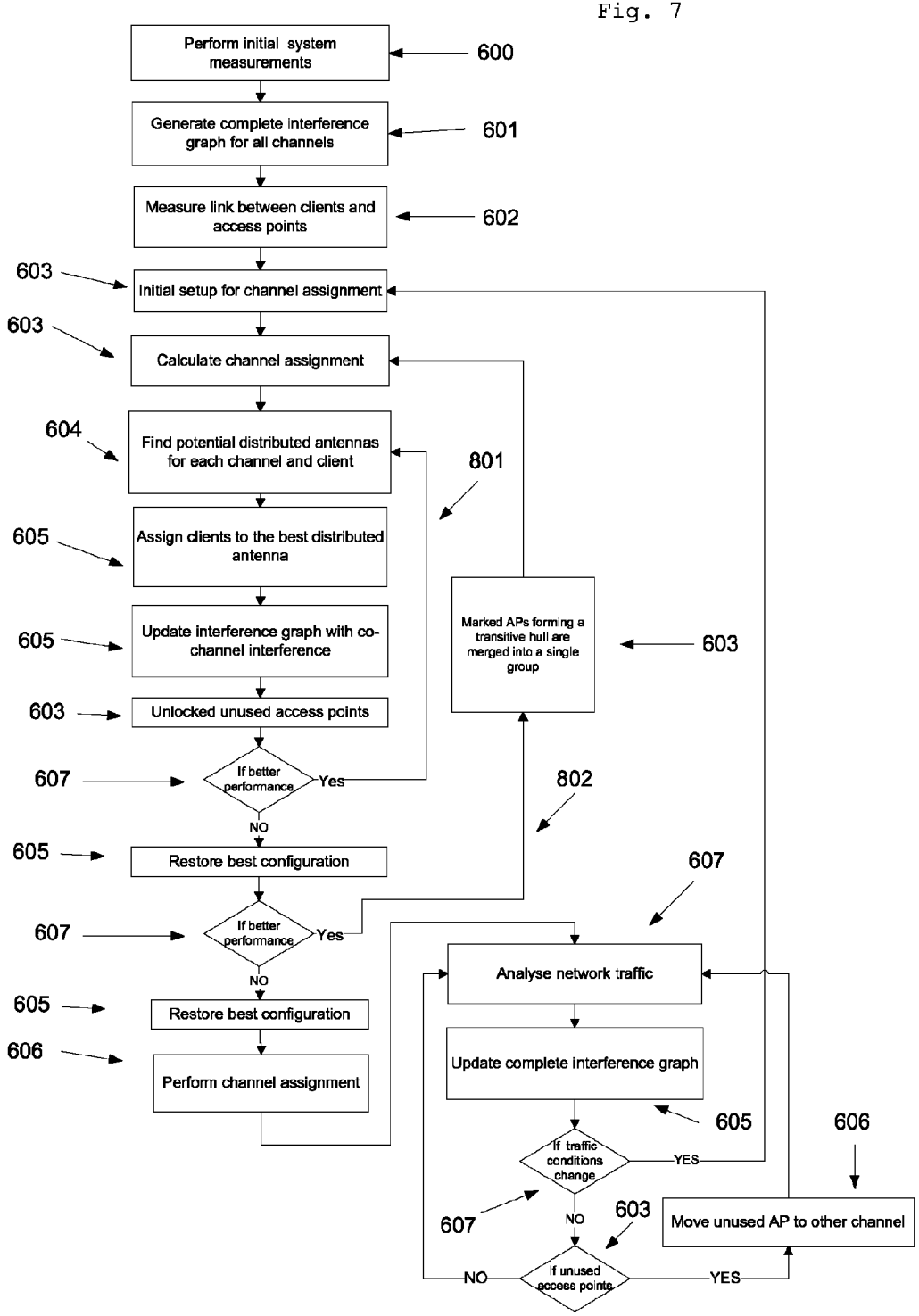

METHOD AND SYSTEM FOR IMPROVING QUALITY OF SERVICE IN DISTRIBUTED WIRELESS NETWORKS

CROSS REFERENCE TO RELATED APPLICATIONS

This application claims priority to European Patent Application No. EP 09 176 572, filed on Nov. 20, 2009, which is hereby incorporated by reference herein in its entirety.

FIELD

The present invention relates to distributed wireless networks, and in particular, to a method for organizing an architecture of to access points.

BACKGROUND

The quality in the wireless access typically depends on the infrastructure technology to provide connectivity. Exemplary technologies are GPRS, WiMax and IEEE 802.11 family or Wi-Fi. Typically, users connect to IEEE 802.11 based access points to get connectivity to the Internet. For this, they use devices equipped with network cards. Exemplary devices are mobile phones, laptops, PDS, MDAs, which are adapted for Internet usage and increasing popular.

In this context, the demand for mobile Internet is growing and quality of service in the wireless access has been constantly increasing. In the area of IEEE 802.11 based infrastructure, the quality during the connectivity has constantly been improved and many methods have been proposed. For example, in U.S. Pat. No. 6,308,085 a distributed antenna system and method of controlling the same is described, comprising a system with multiple antennas and a centralized controller to control and select a subset of the antennas that form the system, in order to generate a distributed antenna system.

In U.S. Pat. No. 5,293,640 a method for planning radio cells is described. The method utilizes an exclusion matrix calculated on the basis of measured field strengths, and an iterative allocating algorithm, which allows an adaptation of the cell planning to traffic conditions in the network. The method includes the following steps: traffic estimation, channel assignment based on estimate, interference measurements and an iterative algorithm for channel assignment based on continued measurements of interference in the cell system.

In U.S. Pat. No. 6,459,901, a method for resource allocation in wireless systems in described, by providing wireless resource allocation techniques where the wireless network resource allocation is based on maximum system gain. The method considers neighbouring links and interference during resource allocation.

SUMMARY

There is a need for an improved method and system for organizing an architecture of access points in a distributed wireless network that is capable of adapting to current traffic conditions.

In an embodiment, the present invention provides a method for organizing an architecture of access points in a distributed wireless network including measuring interference between the access points, assigning radiofrequency channels to the access points based on the measured interference and creating distributed antenna groups of multiple access points operating on a same radio frequency channel.

In another embodiment, the present invention provides a distributed wireless network including a plurality of access points and a central controller connected to the access points via a common backbone. The central controller is configured to measure interference between the access points, assign radio frequency channels to the access points based on the measured interference and create distributed antenna groups of multiple access points operating on a same radio frequency channel.

BRIEF DESCRIPTION OF THE DRAWINGS

Exemplary embodiments are described in more detail below with reference to the drawings, in which

FIG. 7 shows a block diagram illustrating the operation of the central controller according to an embodiment of the method according to the invention.

DETAILED DESCRIPTION

Figure 1:
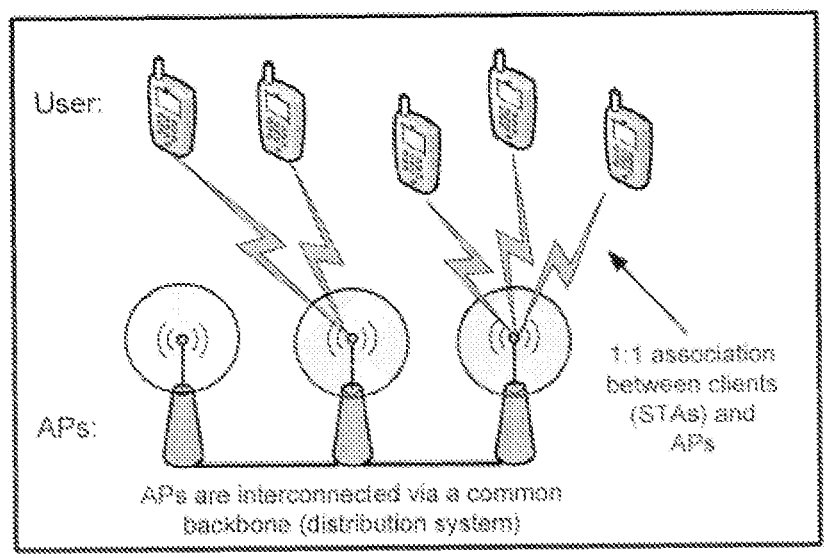
FIG. 1 illustrates a standard IEEE 802.11 based infrastructure network.

In an embodiment, the method and system of the present invention uses modifications only on the wireless network side so that clients compliant to the network can be used without any modifications.

In an embodiment, the present invention provides a method for organizing an architecture of access points in a distributed wireless network is provided. The network may be any one of a GPRS type network, a WiMax type network or an IEEE802.11 type or Wi-Fi network. According to the method, the interference between the access points is measured, radiofrequency channels are assigned to the access points based on the measured interference and distributed antenna groups of multiple access points operating on the same radio frequency channel are created. Measuring the interference between the access points may include measuring interference from other networks and/or other foreign sources of interference. The number of radiofrequency channels to be assigned to a set of spatially co-located access points may be determined based on the remaining wireless capacity of each access point in considered part of the network and the wireless capacity of an access point may be estimated in terms of physical and/or virtual channel load and/or number of detected packet collisions.

The method may further comprise assigning a client to one of the distributed antenna groups based on a predetermined metric including information on the network load. A client may be assigned to one of the distributed antenna groups to which the client has the best downlink and uplink channel quality. Also, the client may be assigned to the distributed antenna group having the highest remaining wireless capacity, or depending on the type of traffic requested by the client or on a priority assigned to the client. Furthermore, the capacity of a wired backbone connecting the access points may be estimated and a client be assigned to the distributed antenna group with the highest remaining wired capacity wherein the remaining wired network load of each access point within the selected distributed antenna group may be considered by assigning a priority value to each access point in the distributed antenna group. Temporarily unused access points can be used to continuously measure the interference between other access points and themselves.

In an embodiment, the invention provides a distributed wireless network comprising a plurality of access points and a central controller connected to the access points via a common backbone. The central controller is adapted for assigning radio frequency channels to the access points by using the method of the invention. The central controller may comprise a system monitor for measuring the interference between all access points connected to the network and a graph generator for generating an interference graph. Further, the central controller may comprise a link monitor for measuring the link between a particular client and a chosen access point, a channel assignment analyzer for calculating the channel assignment using the interference graph, a traffic analyzer for determining wireless channel capacity of the network, the capacity of the wired backbone and the type of traffic.

Accordingly, tradeoffs between the generation of distributed antenna receiver systems, load balancing and dynamic channel assignment can be managed. The method does not target specific benefits due to an isolated method, but overall benefits controlling the three methods proposed according to network traffic conditions. The concepts of channel assignment, distributed antenna and load balancing are combined according to the present invention and the balance between coverage and capacity in a distributed wireless network, considering traffic conditions, is managed. It is noted in this context that the present invention targets a specific wireless technology, namely an IEEE 802.11 based infrastructure network system. Nevertheless, the benefits of the present invention can also be exhibited in other distributed wireless systems.

By combining the concept of distributed antennas with channel assignment, the system can react to changes in the traffic conditions being expressed e.g. by number of users and applications, and interference levels. Also, the channel assignment method is improved by adding the possibility to build distributed antennas, considering balance between capacity and coverage. Moreover, load balancing is also combined with distributed antennas and channel assignment so that the system can balance between capacity in the wireless network and the capacity of the wired backbone.

In an embodiment, the present invention relates to an IEEE 802.11 infrastructure network type of system, and in particular, to a method for traffic aware assignment of radiofrequency (RF) channels to access points and in combination with the creation of distributed receive antennas in the uplink and also network load distribution, to exploit channel diversity and spatial diversity, respectively, all these responding to the changes in traffic conditions.

In the context of the present invention, traffic awareness means that the method optimizes all three tasks for the traffic conditions in the system, i.e. it reacts to changes in the traffic conditions (number of clients and number and type of applications). Furthermore it considers whether there are unicast (transmitter sends a message to each of the receivers), multicast (or one message from the transmitter to multiple receivers) or a mix of both traffic patterns in the system. In addition also traffic from foreign networks can be considered. Therefore the channel load, occupied by foreign networks and also other sources of interference (i.e. microwave oven), is taken into account during the channel assignment and load balancing of the clients. Here sparsely used channels are preferred.

The efficiency of an IEEE 802.11 infrastructure network is determined by the achieved level of Quality of Service (QoS). With the proposed method QoS can be improved in terms of an increased data throughput and a decreased latency and jitter. Finally, in a particular embodiment of the method and system described in this invention, the complexity for controlling the traffic aware RF channel assignment and distributed antenna creation should be minimized to keep the benefits of this invention in terms of QoS. The proposed method requires only modifications on the IEEE 802.11 infrastructure network side. Therefore, ordinary IEEE 802.11 compliant clients can be used without any modifications.

An exemplary embodiment of a system that implements the present invention comprises a collection of access points that communicate via a common backbone to a central controller. The central controller is responsible for all control and management protocols involved in the implementation of the method for traffic aware assignment of RF channels, the creation of distributed receive antenna systems and the distribution of network load.

An exemplary method of an embodiment of the present invention is conformed by three main parts. One part is responsible for the traffic aware RF channel assignment that is to associate to each access point a RF channel depending on the network traffic situation. The second part is responsible for the creation of distributed receive antenna systems. The third part is network load distribution that is to move clients from one access point to another depending on the traffic situation.

The first part of the method, traffic aware RF channel assignment, is based on the fact that by utilizing multiple non-interfering RF channels multiple transmissions can take place in the same spatial domain without the adverse effects of co-channel interference.

The second part, responsible for the creation of the distributed receive antenna system, manages the grouping of multiple access points operating on the same RF channel to form distributed (virtual) receive antennas in the uplink, whereas to improve packet reception from clients (mobile devices). With this, the method uses efficiently user-data broadcasting and the fact that the reception is probabilistic and packet loss is weakly correlated among access points when access points are well selected. Therefore packet loss correlation is considered when estimating distributed antennas.

The last part of the method implement the task of network load distribution is twofold. On the one hand, clients can assigned equally to neighboring access points operating on different RF channels thus resulting in an improved system performance (QoS). On the other hand, even if for two neighboring access points operating on the same RF channel it makes sense to balance the associated clients in case of a slow backbone connection (e.g. DSL). Therefore the proposed method takes both aspects into account when calculating the association between clients and access points.

In an exemplary system or method of an embodiment of the present invention, traffic awareness is defined as the reaction to changes in the traffic conditions of the IEEE 802.11 network. In a particular embodiment, traffic changes can be represented by the number of users connected to the access points that comprise the system and for the number and types (unicast/multicast or constant/variable data rate) of applications that are running in the computing devices of the users connected to the access points. In addition the proposed method also considers interference caused by traffic from foreign, not necessarily 802.11, networks.

This method has three main parts that cooperate to improve the overall quality of service of the IEEE 802.11 based infrastructure. These three parts cooperate as follows.

Based on the current network traffic, the central controller estimates whether the network lacks of capacity (e.g. due to a high number of users) or coverage. In the case in which the system lacks from capacity, the number of channels used for channel assignment will be incremented to improve the capacity of the IEEE 802.11 based system. However, the use of additional channels, impacts the creation of distributed antennas because the number of access points operating on the same channel will decrease. The described system trade off is used by the method to fluctuate between dynamic channel assignment and distributed virtual antenna creation.

The load balancing protocol distributes the clients, depending on their traffic-pattern, among the available access points. Thus, the traffic load is evenly distributed over the available channels to reduce interference. It also considers the available bandwidth in the backbone. If the backbone appears to be the bottleneck, the clients are distributed among the access points according to the available bandwidth in the backbone of the access points and the requested bandwidth of the clients.

In the case that the networks lacks of coverage and the number of users is low, the number of used channels is decreased, which results in a higher number of access points operating on the same channel. This increases the number of possible distributed antennas. By creating larger distributed antennas, the coverage of the network will be increased.

If the usage of applications using multicast operations is detected, e.g. by the central controller, all clients using the multicast application are forced to switch to a common channel, so that the number of multicast packets can be reduced by exploiting the broadcast.

As shown in FIG. 1, an IEEE 802.11 based infrastructure network generally consist of two entities—access points (AP) and users/stations (STA). In general access points are interconnected via a common, mostly wired, backbone, the so-called distribution system. During the association a user selects exactly one access point to which it will associate, i.e. all traffic destined to the infrastructure and the user will be routed over that access point.

Figure 2:
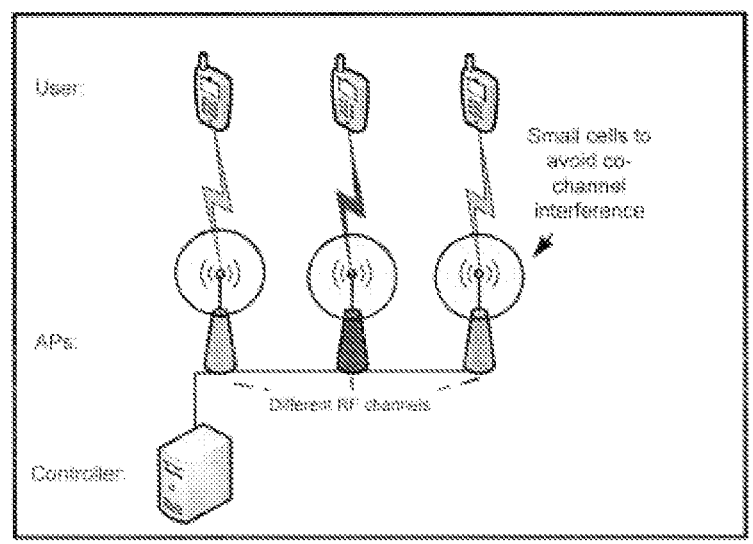
FIG. 2 illustrates traffic aware RF channel assignment.

In an IEEE 802.11 based network, multiple RF channels can be used, i.e. IEEE 802.11b/g offers 3 and IEEE 802.11a 12 non-interfering RF channels. By using multiple non-interfering RF channels in an IEEE 802.11 infrastructure network QoS can be significantly improved. This fundament is the bases for the traffic aware RF channel assignment algorithm that is one of the three parts of the method according to the invention. FIG. 2 shows an exemplary system of the present invention. In the system shown in FIG. 2, the number of clients connected to the system and access points forming the system is the same as the number of non-interfering channels offer, for example, in the IEEE 802.11b/g technology. Hence, to benefit from the use of non-interfering channels and to enhance QoS in the system, a particular beneficial traffic aware RF channel assignment method relates one client to each access point using a non-interfering RF channel, as shown in FIG. 2.

Figure 3:
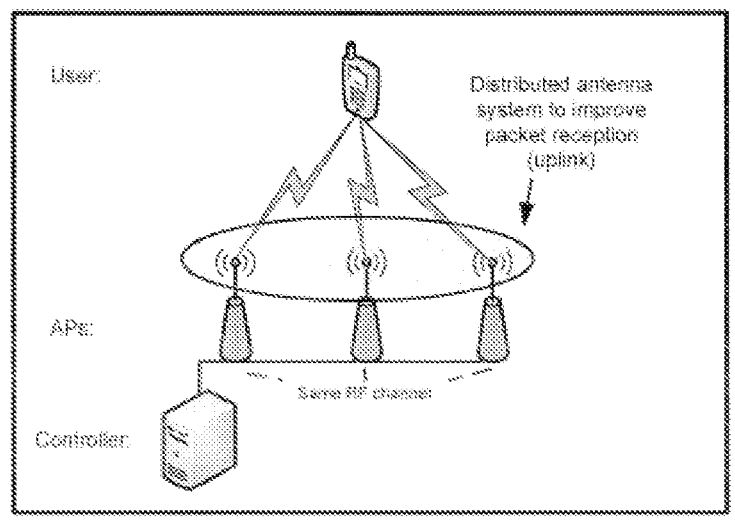
FIG. 3 illustrates a distributed receive antenna system.

The concept of a distributed antenna system is depicted in FIG. 3. By grouping multiple access points operating on the same RF channel a distributed receive antenna system is created. Here the access points are connected by a common backbone, e.g. wired LAN. With distributed antennas the packet reception in the uplink is improved (macro-diversity). The method considers the fact that the packet reception among access points may be correlated (global interference source) reducing the gain of a distributed antenna system. Therefore the method considers this when creating distributed antennas on a per client basis.

Figure 4:
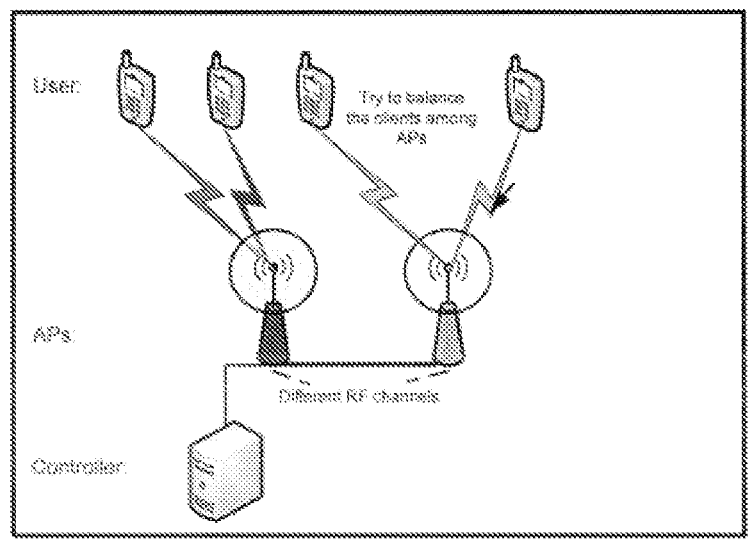
FIG. 4 illustrates network load distribution.

The concept of load distribution is illustrated in FIG. 4. The idea is to distribute the clients among the available access points even when the wireless link of some client degrades. This is especially interesting if two neighboring access points are operating on different RF channels. Even for two neighboring access points operate on the same RF channel it makes sense to balance the associated clients due to a slow backbone connection (e.g. DSL).

Figure 5:
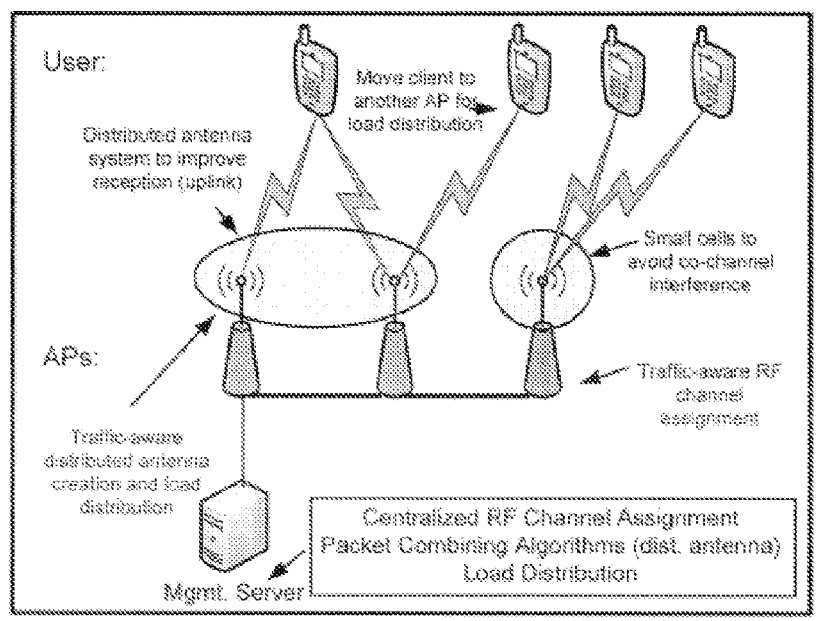
FIG. 5 illustrates a combination of the three concepts shown in FIGS. 2 to 4, according to an embodiment of the present invention.

In an embodiment, the present invention makes use of all three concepts, i.e. distributed antenna creation, load distribution and the usage of multiple RF channels, to improve QoS in 802.11 infrastructure networks (see FIG. 5). Here a central controller is depicted which is responsible to accomplish all three tasks. In the illustrated example the number of users compared to access points is low. Therefore multiple access points are grouped together to form distributed (virtual) antennas. If the number of users increases additional RF channels are used to improve the overall system performance. The proposed method dynamically adapts to the traffic conditions, i.e. number of users and applications. So the proposed method for both concepts depends on the network traffic, i.e. the assignment is totally different in a network where the majority of flows are either unicast or multicast. Finally, the users are distributed among access points and Channels in a way to improve the overall system performance.

In dense networks (high number of access points/clients) it is very likely that the number of available RF channels is not sufficient to assign a different RF channels to nearby access points, i.e. the coverage and interference areas of access points will overlap with each other. This results in high co-channel interference and problems like hidden-node if those access points are operating on the same frequency. The proposed method estimates how strong two access points will interfere with each other when using the same channel. This is accomplished by using a training sequence, i.e. at network idle times the management server set-ups packet flows between access points. This information is used for the creation of the interference graph.

Figure 6:
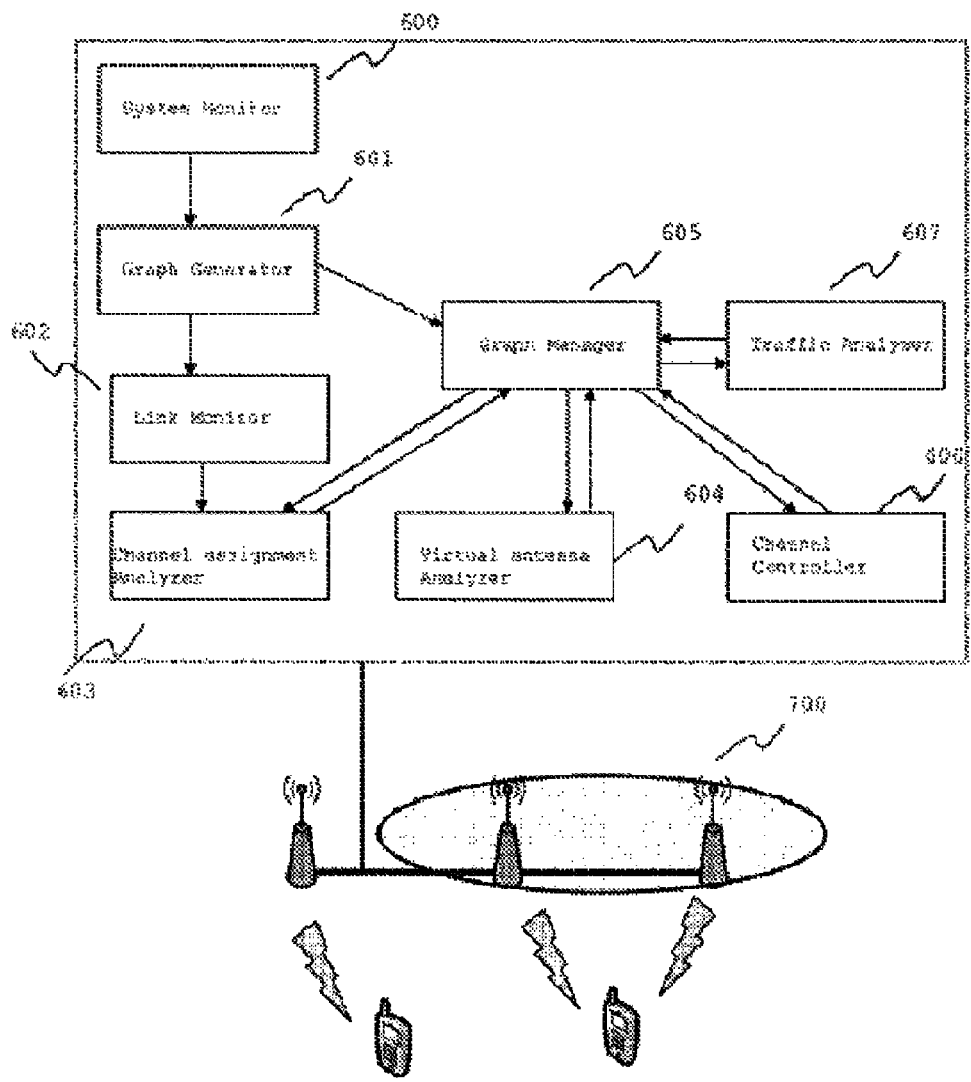
FIG. 6 shows a block diagram illustrating a method of an embodiment of the present invention.

FIG. 6 shows the central controller used in an embodiment of the system according to the invention. The operation of the central controller according to an embodiment of the method according to the invention is illustrated in the block diagram of FIG. 7. In this embodiment, the System Monitor 600 measures interference between all access points connected to a particular IEEE 802.11 based infrastructure 700. The interference from foreign networks (e.g. microwave ovens or other wireless networks) is also considered. Using the measurements, a graph is build by the Graph Generator 601 to include the interferences values among access points.

The link between a particular client and a chosen access point is measured by the Link Monitor 602. Then, the (RF) channel assignment Analyzer locks every access point, which select them to be considered during the channel assignment. Again, only locked access point are considered for channel assignment. The channel assignment is calculated by the Channel assignment Analyzer (603) for each locked access point.

Then, using the output from the Channel assignment Analyzer 603, the Distributed antenna Analyzer 604 estimates the potential distributed (virtual) antennas for each channel and client. During that, locked access points have to stay on their selected channel, whereas unlocked access points can use any channel. After that, to each client one distributed antenna is assigned considering an optimal load distribution among the channels and the access points. Unlocked access points are locked if they are participating in a distributed antenna (DA), which is assigned to one client. To unlocked access points participating in a distributed antenna the channel of the other locked access points in the DA is assigned. In a particular embodiment, the Distributed antenna Analyzer 604 and the Channel assignment Analyzer 603 correspondingly, may consider service provider and user specific policies during the assignment of DAs.

The interference graph is updated by the Graph Manager 605, adding the information about potential co-channel interference and the updated graph is used by the Channel Assignment Analyzer 603 to identify unused access points. All unused access points get unlocked so that they can use any channel. The potential improvement is determined by the Traffic Analyzer 607 considering at least the following variables: user traffic pattern, user load in the channel and link quality between the user and the unused access point.

If the last estimation and assignment of DA could improve the overall system conditions, then the DAs are estimated again (801—search for maximum).

If the last estimation and assignment of DA could not improve the overall system conditions, then the Graph Manager 605 restore the best found configuration. If this results in a better overall system conditions since the last channel assignment, then all locked access points forming a transitive hull are merged into a single group, e.g. if one access point is part of two different DAs then theses two DA are merged into a single group. This is done by the Channel assignment Analyzer 603.

The Channel Assignment Analyzer 603 performs a new channel assignment considering the group of access points. To all access points belonging to the same group, the same channel is assigned during the channel assignment.

Then the DAs are estimated and assigned 604 again with the new channel assignment (802—search for maximum).

If the last channel assignment could not improve the overall system conditions then the best configuration is restored by the Graph Manager 605.

The actual channel assignment is performed by the Channel Controller 606. Then the Traffic Analyzer 607 uses the new configuration and traffic conditions of the IEEE 802.11 based network infrastructure to analyze again the traffic conditions. The complete interference graph is updated by the Graph Manager 605 based on the resulting analysis from the Traffic Analyzer 607.

If the traffic conditions in the system change, a new channel assignment is calculated by the Channel assignment analyzer 603 as described aforementioned, implementing a control loop. In the case there are unused access points that may be assigned to other channels by the Channel controller 606, then these changes are performed and a new traffic analysis is done by the Traffic Analyzer 607 as describe above, implementing a control loop.

While the invention has been particularly shown and described with reference to preferred embodiments thereof, it will be understood by those skilled in the art that various changes in form and details may be made therein without departing from the spirit and scope of the invention.

What is claimed is:

1. A method for organizing an architecture of access points in a distributed wireless network, wherein the distributed wireless network comprises a plurality of access points connected to a backbone and a plurality of client devices connected to the plurality of access points, the method comprising:
    measuring interference corresponding to the plurality of access points;
    measuring links between the plurality of client devices and the plurality of access points, wherein measuring the links includes measuring network traffic and link quality corresponding to each link; and
    in response to measuring the interference and measuring the links:
        determining a number of radiofrequency (RF) channels to use in the distributed wireless network;
        associating access points of the plurality of access points with an RF channel and client device such that each of the plurality of client devices is associated with an access point via an RF channel, wherein not all of the plurality of access points are associated with an RF channel and a client device; and
        generating a distributed antenna group by grouping an unassociated first access point of the plurality of access points with an associated second access point, wherein the grouping comprises associating the first access point with an RF channel associated with the second access point and associating a client device connected to the second access point with the distributed antenna group.

2. The method of claim 1, wherein measuring the interference corresponding to the plurality of access points includes measuring interference from external sources.

3. The method of claim 1, wherein association between a distributed antenna group and a client device is used on a downlink and uplink channel quality between the distributed antenna group and the client device being better than the downlink and uplink channel quality between other distributed antenna groups and the client device.

4. The method of claim 1, wherein association between a distributed antenna group and a client device is based on the distributed antenna group having the highest available wireless capacity relative to other distributed antenna groups.

5. The method of claim 1, wherein association between a distributed antenna group and a client device is based on a type of traffic corresponding to the client device.

6. The method of claim 1, wherein association between a distributed antenna group and a client device is based on a priority assigned to the client device.

7. The method of claim 1, wherein access points not connected to any client device are utilized to perform interference measurements.

8. The method of claim 1, wherein the client device associated with the distributed antenna group is connected to both the first and second access points.

9. The method of claim 1, further comprising:
    determining, based on network traffic and interference conditions, that current network architecture having the generated distributed antenna group is less optimal than a previously configured architecture having a different distributed antenna group; and
    reverting the current network architecture to the previously configured architecture.

10. A distributed wireless network, comprising:
    a plurality of access points; and
    a central controller connected to the access points via a backbone, the central controller being configured to:
        measure interference corresponding to the plurality of access points;
        measure links between the plurality of client devices and the plurality of access points, wherein measuring the links includes measuring network traffic and link quality corresponding to each link; and
        in response to measuring the interference and measuring the links:
            determine a number of radiofrequency (RF) channels to use in the distributed wireless network;

associate access points of the plurality of access points with an RF channel and a client device such that each of the plurality of client devices is associated with an access point via an RF channel, wherein not all of the plurality of access points are associated with an RI channel and a client device; and generate a distributed antenna group by grouping an unassociated first access point of the plurality of access points with an associated second access point, wherein the grouping comprises associating the first access point with an RF channel associated with the second access point and associating a client device connected to the second access point with the distributed antenna group.

11. The network of claim 10, wherein measuring the interference corresponding to the plurality of access points includes measuring interference from external sources.

12. The network of claim 10, wherein the central controller is further configured to determine a wireless channel capacity of the network, a capacity of the backbone, and a type of traffic.

13. The network of claim 10, wherein the access points include at least one of a General Packet Radio Service (GPRS) access point, a Worldwide interoperability for Microwave Access (WiMax) access point, and an IEEE802.11 access point.

* * * * *